Aug. 8, 1967  J. MORKOSKI  3,334,692
IMPLEMENT TRACTOR HITCH
Filed April 26, 1965  4 Sheets-Sheet 1
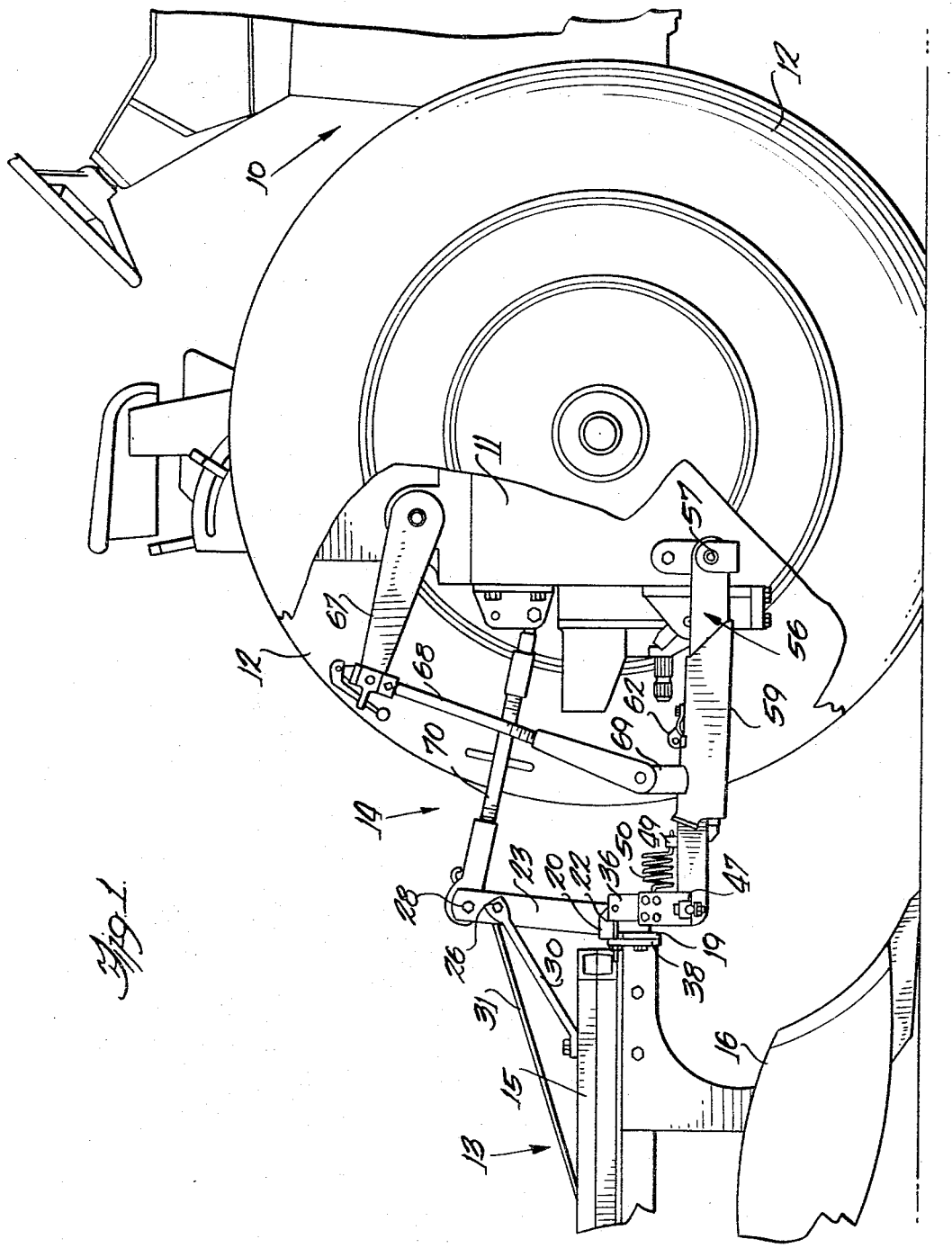
Inventor
James Morkoski
J K McNeill
Attorney

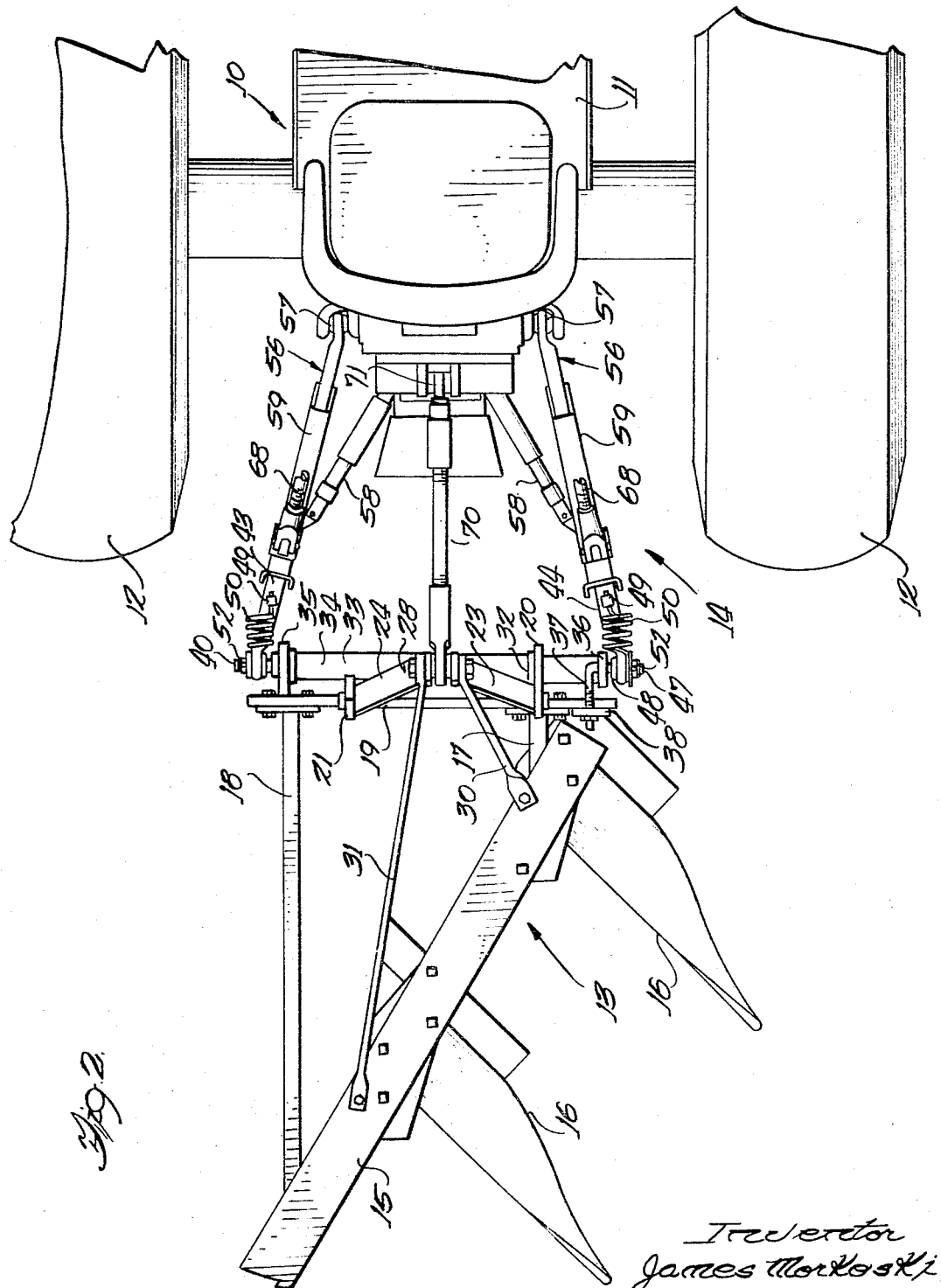

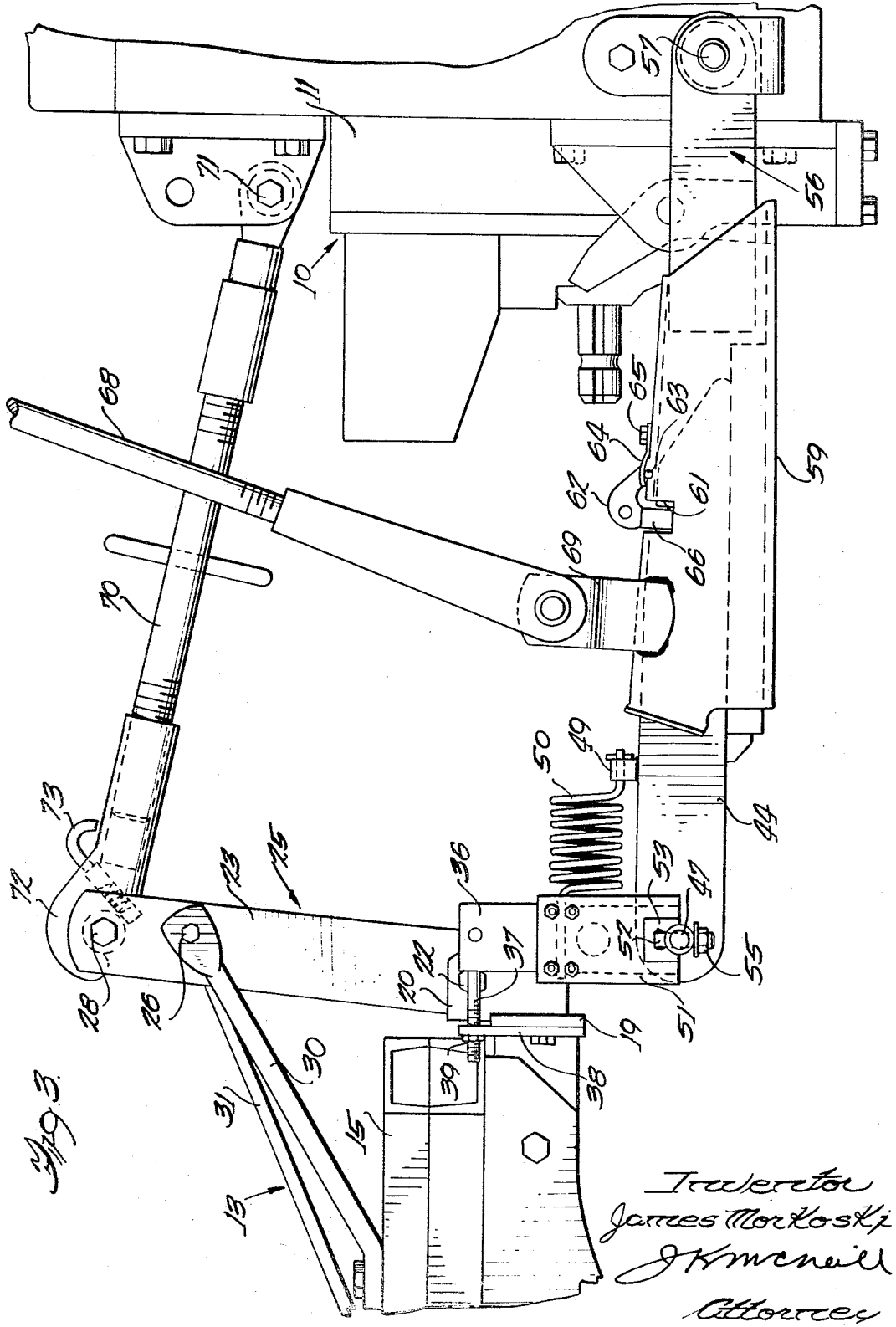

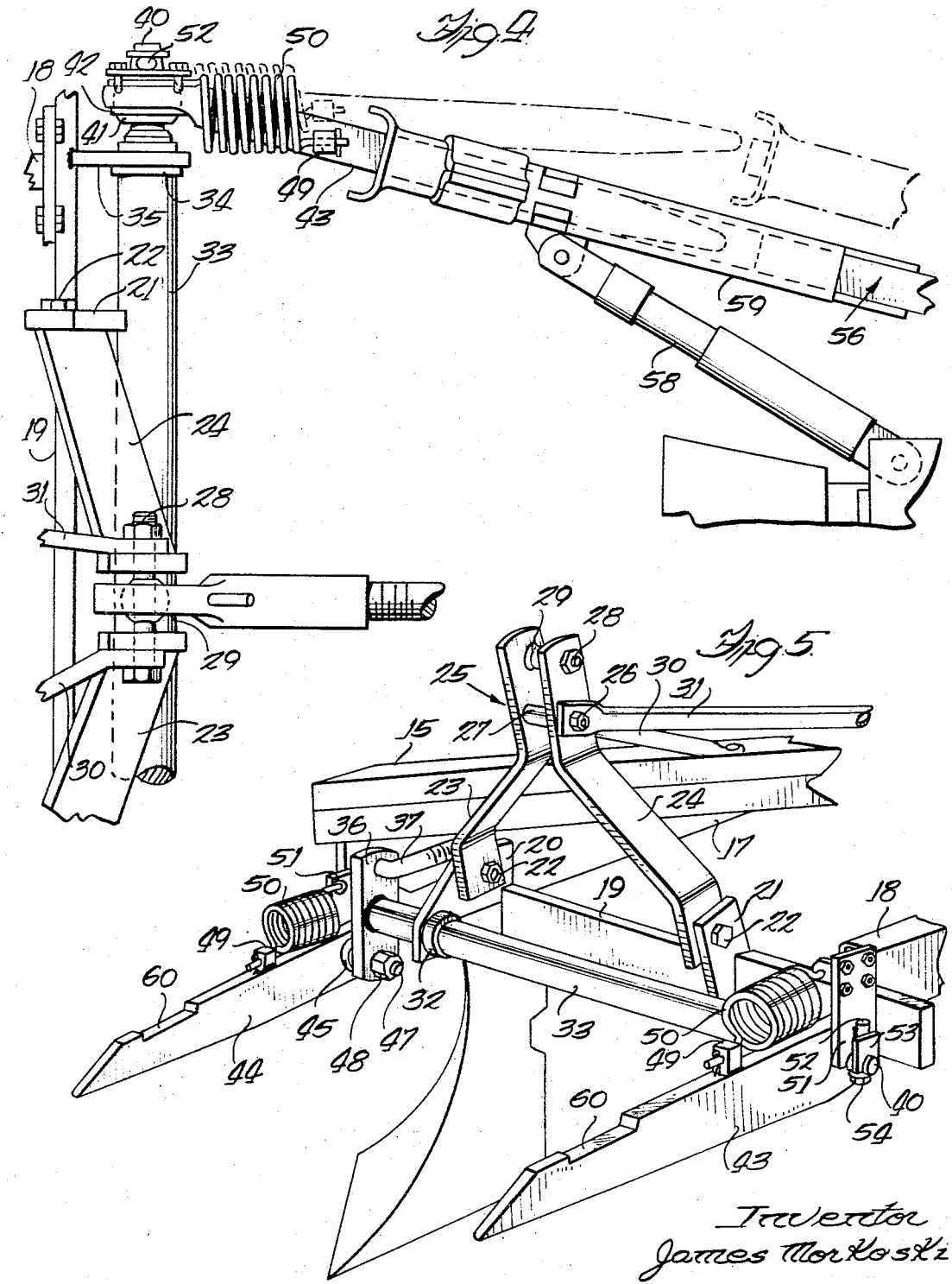

United States Patent Office 3,334,692
Patented Aug. 8, 1967

3,334,692
IMPLEMENT TRACTOR HITCH
James Morkoski Clarendon Hills, Ill., assignor to International Harvester Company, a corporation of Delaware
Filed Apr. 26, 1965, Ser. No. 450,902
4 Claims. (Cl. 172—275)

ABSTRACT OF THE DISCLOSURE

The parallel 2-point hitch shafts on an implement are accommodated to the forwardly converging lower links of a tractor 3-point hitch having elongated sockets, permitting an automatic integral connection to be made between the implement and tractor, by pivoting the shafts on the implement and holding them parallel by springs until they enter the 3-point hitch sockets, whereupon they are forced against the action of the springs to converge inwardly as they are fully received in the sockets.

---

This invention relates to implements and to the tractors by which they are propelled. More specifically, the invention concerns novel hitch means for quickly effecting the connection of an implement to a tractor.

One well known apparatus for connecting an implement to a tractor is the so-called 3-point hitch, wherein laterally spaced lower links pivoted on the tractor converge to a theoretical hitch point at a favorable location in advance of the rear tractor wheels, and an upper link also pivoted on the tractor converges with the lower links at a location in advance of the rear wheels of the tractor, all for reasons well known in the art. Another quick attaching means is the so-called fast or 2-point hitch consisting of laterally spaced generally parallel members requiring no manual connecting operations on the part of the operator, who can merely back his tractor to the implement for an automatic connection permitting him to pick up the implement and drive to the location where it is to be used.

The present invention has for its object the provision of a novel hitch means combining the converging features of the links of a conventional 3-point hitch with the quick attaching features of the 2-point hitch.

Other objects and advantages of the invention will become clear from the following detailed description when read in conjunction with the accompanying drawings, wherein:

FIGURE 1 is a view in side elevation of the rear end of a tractor, with parts removed, showing a portion of an implement mounted on the tractor by hitch means incorporating the features of this invention;

FIGURE 2 is a plan view of the structure shown in FIGURE 1, with parts broken away;

FIGURE 3 is an enlarged side elevation of the hitch structure shown in FIGURES 1 and 2;

FIGURE 4 is an enlarged detail in plan showing a portion of the hitch structure of this invention; and FIGURE 5 is a view in perspective of the forward end of the implement shown in FIGURES 1 and 2.

In the drawings the numeral 10 designates a traction device in the form of a farm tractor having a main body 11 and transversely spaced rear drive wheels 12. Although only the rear portion of the tractor is shown, it may be understood that the device 10 is a conventional farm tractor having a longitudinal extending body and supported by wheels at its front end.

An implement device 13 in the form of a moldboard plow is shown attached to the tractor 10 by hitch means 14 hereinafter to be described, and may be of the semi-mounted type or one which is completely lifted upon the tractor for transport purposes. Only the forward part of the implement device 13 is shown and may be understood to comprise a supporting beam or backbone 15 on which a plurality of moldboard plow units 16 may be mounted. Also forming a part of the plow frame are longitudinally extending rails 17 and 18 connected at their front ends by a crossbar 19, the latter having affixed thereto laterally spaced brackets 20 and 21, on which are mounted, by bolts 22, the legs 23 and 24 of an upright or mast 25, the upper ends of legs 23 and 24 being secured together by a bolt 26 and held apart by a spacer 27. Another bolt 28 connects the upper ends of the legs 23 and 24, a pivot ball 29 being mounted on the bolt between the arms and serving a purpose hereinafter to be described. Straps 30 and 31 are connected at one end to bolt 26 and at their other ends to beam 15 to rigidly support the mast 25.

Bracket 20 at one end of crossbar 19 is provided with a bearing 32 to support one end of a cylindrical spacer bar 33 extending transversely of the implement and parallel to crossbar 19, the other end of bar 33 being carried in a bearing 34 mounted in a lug 35 affixed to and projecting forwardly from crossbar 19.

At one end of spacer bar 33 is affixed, as by welding, a crank arm 36 having a portion thereof extending above the bar and adjustably connected by a hookbolt 37 with a plate 38 secured to cross-piece 19, adjustment being provided by a nut 39 to rock crank arm 36 and spacer 33 about its axis. The end of spacer 33 remote from arm 36 has a reduced spindle portion 40 on which is mounted the ball portion 41 of a universal joint formed by reception of ball 41 in a socket 42 carried by the rear end of hitching link means in the form of shaft-like member 43. A similar shaft-like link member 44 is provided at its rear end with a socket 45 to receive a ball 46 on the outer end of a pin 47 extending through the lower projecting portion of crank arm 36 and having a nut 48 thereon for rigidly securing the pin to the arm.

The shaft-like hitch members 43 and 44 are substantial duplicates, each being provided with an upwardly projecting lug 49 serving to anchor one end of a coil spring 50, the other end of which is anchored to a plate 51, the lower end of which has welded thereto a pin 52, each of which is provided with a centering plate 53. Pin 52, shown in FIGURES 2, 4, and 5, is received in a transverse opening in spindle portion 40 of bar 33 and is threaded at one end to receive a nut 54 by which plate 51 is secured to bar 33. On the other side of the implement, as shown in FIGURES 1, 2, and 3, pin 52 is received in a transverse opening through pin 47 and is threaded at its lower end to receive a nut 55 by which plate 51 is affixed to crank arm 36.

Hitch link members 43 and 44 are universally pivoted to spindle member 40 and pin 47, respectively, to accommodate vertical movement of the link members against the bias of springs 50. As shown in FIGURE 5, springs 50 hold the link members 43 and 44 in a position generally horizontal with respect to the ground line. As shown by dotted lines in FIGURE 4, link 43 is held by spring 50 in a lateral position generally parallel to the line of travel and to its associated link 44, but converging forwardly somewhat with the latter.

A pair of laterally spaced, forwardly converging link members 56 are connected at their forward ends by universal pivot means 57 to the tractor, but are adjustably held in their laterally spaced forwardly converging positions by braces 58 connected between the links and the tractor.

Links 56 are substantial duplicates, and each includes longitudinally extending tubular socket means 59, having rearward openings which are outwardly flared for the sliding and telescopic reception of shaft-like link members 43 and 44 carried on the implement.

As indicated in dotted lines in FIGURE 4, when the implement link members 43 are in generally parallel relation with the implement disconnected from the tractor, the tractor may be backed up to the implement until the rear ends of socket link members 56 substantially align with the forward ends of the shaft-like members or prongs 43 and 44. Upon continued backing of the tractor to the implement, the prongs 43 and 44 are guided into the openings of sockets 59 and telescope therein, members 43 and 44 converging inwardly against the action of springs 50 to conform to the convergence of the sockets 59.

As shown in FIGURE 3, each of the shaft-like members 43 and 44 is provided with a recess 60 in its upper edge adapted to register with an opening 61 in socket member 59. A latch member 62 pivoted at 63 on the socket member is engaged by a leaf spring 64 secured to the socket member by bolt 65 to urge the latch member 62 to a locked position as indicated in FIGURES 1 and 3 with an extension 66 received in the recesses 60 and 61 to hold member 43 and 44 in their respective sockets under the draft load provided by the tractor when the implement is in operation.

The implement 13 may be of the semi-mounted type or one which is lifted and transported entirely upon the tractor. For this purpose any well known power-lift mechanism is provided for control by the tractor operator and includes laterally spaced lift arms 67, each of which is connected by a lift link 68 to a lug 69 secured to the socket members 59.

An upper adjustable link 70 is provided and pivotally connected at 71 to the tractor body. As shown in FIGURES 1 and 3, link 70 extends forwardly and downwardly in converging relation with respect to the plane of the lower link members 56 and converges therewith at a location ahead of the rear drive wheels 12, lower links 56 likewise converging in a horizontal plane at a location in advance of the rear wheels 12.

The rear end of upper link 70 terminates in a hook element 72 having a socket portion adapted to receive the pivot ball 29 at the upper end of mast 25, and may be secured thereto by any suitable means, preferably spring pressed pin means such as indicated at 73, to provide for quick attachment and a ready release of the upper link from the mast of the implement.

It is believed that the novel implement-tractor hitch mechanism of this invention will be clearly understood from the foregoing description. It should likewise be understood that the invention has been described in its preferred embodiment and that modifications may be made therein without departing from the spirit of the invention or the scope of the appended claims.

What is claimed is:

1. Hitch means forming a draft connection between an implement and a tractor, comprising laterally spaced longitudinally extending forwardly converging tubular socket members pivotally connected at their forward ends to the tractor in draft-receiving relation and having openings at their rear ends, laterally spaced generally parallel shaft-like members pivotally connected at their rear ends to the implement and having their other ends extending forwardly in general alignment with said openings and slidably receivable in the respective of said socket members upon movement of the tractor toward the implement, the pivotal connection of said shaft-like members to the implement accommodating forward convergence thereof with said socket members to form an integral connection between the tractor and the implement, said shaft-like members being yieldably biased to their parallel relation, and the forward ends of said shaft-like members being forced inwardly against said bias by the forward convergence of said socket members upon reception of the shaft-like members therein.

2. The invention set forth in claim 1, wherein the means biasing the shaft-like members toward parallel relation is a pair of springs connected at one end to the implement and at the other end to the shaft-like members.

3. Hitch means forming a connection between an implement device and a tractive device, comprising a first pair of laterally spaced forwardly converging link members pivotally connected at their forward ends to the tractive device, a second pair of laterally spaced generally parallel link members pivotally connected at their rear ends to the implement for independent lateral movement of the forward ends thereof, one of said pairs of link members including tubular socket means adapted to align with the free ends of and to telescopically receive the other of said pair of link members upon movement of the tractive device toward the implement, the free ends of said other pair of link members being movable inwardly into converging relation in response to telescopic association of said first and second pairs of link members, and means connected between said implement device and said second pair of link members for yieldably biasing the latter to said generally parallel relation.

4. Hitch means forming a connection between an implement device and a tractive device, comprising a first pair of laterally spaced forwardly converging link members pivotally connected at their forward ends to the tractive device, a second pair of laterally spaced generally parallel link members pivotally connected at their rear ends to the implement for independent lateral movement of the forward ends thereof, one of said pairs of link members including tubular socket means adapted to align with the free ends of and to telescopically receive the other of said pair of link members upon movement of the tractive device toward the implement, the free ends of said other pair of link members being movable inwardly into converging relation in response to telescopic association of said first and second pairs of link members, means connected between said implement device and said second pair of link members for yieldably biasing the latter to said generally parallel realtion, and locking means mounted on said socket means and cooperative with said second pair of link members to releasably lock them in said socket means.

References Cited

UNITED STATES PATENTS 2,914,342  11/1959  Silver et al. _____ 172—450 X
2,959,233  10/1960  Scarlett et al. ____ 172—275 X ABRAHAM O. STONE, *Primary Examiner.*

J. R. OAKS, *Assistant Examiner.*